Sept. 7, 1965  E. B. WILSON  3,204,989

PIPE JOINT

Filed June 5, 1962

INVENTOR
EDWARD B. WILSON
BY
*William W. Stokes*
ATTORNEY

United States Patent Office 3,204,989
Patented Sept. 7, 1965

3,204,989
PIPE JOINT
Edward B. Wilson, Philadelphia, Pa., assignor to The Barlow Corporation, Philadelphia, Pa.
Filed June 5, 1962, Ser. No. 200,285
2 Claims. (Cl. 285—50)

The present invention relates to bolted flanges for pipe joints and, more particularly, to flanges intended and adapted to insulate electrically from one another the sections of pipe which they join.

In installations of pipe coming in contact with the earth for substantial distances as by being buried in or lain on the ground, as is the case with pipe carrying natural or artificial gas or petroleum products, some portions of the pipe are at electrostatic potential differing from the electrostatic potential existing at other portions of it. When most of the lengths of pipe are joined by electroconductive joints such as welded joints, as is preferred, these different electrostatic potentials induce electrolytic action at localized portions of the pipeline with resultant acceleration of pitting and corrosion. This electrolytically induced degradation of the pipe metal exists even though the pipe and the joints are coated with asphaltic or other suitable coatings.

In order to minimize this effect and to prolong the life of the pipeline, electrically insulated joints, usually in the form of bolted flange joints are inserted in the line from time to time. As is well known, flanged joints are inserted into a pipeline by fixing the matching halves of the flange to the adjoining pipe sections as by screwing onto the threaded pipe ends or by welding. As is also known, an insulated bolted flange joint provides means associated with the flange valves such as a gasket of electrical insulating material between the matching flanges of the joint or a suitable coating of insulating material on the matching faces adapted upon compression to prevent leakage of fluid from the pipeline and passage of current between the flange valves, and, in addition, spools of insulating material in the bolt holes and surrounding the bolts as well as suitable insulating washers receiving the spool ends and disposed under the nuts utilized to place the bolts under tension. These joints maintain insulating integrity only if they are and remain moisture impervious.

In the past assembly of such insulating flanges in the field has resulted in a disappointingly high frequency of joints which, independently of the care used in selection of the insulating spools, washers, gaskets and other elements, both with regard to fit and materials, failed to maintain their insulating integrity during service.

The object of this invention is to provide insulated bolted pipe flanges which can be infallibly installed in the field to provide insulating integrity initially and maintain it during long periods of service.

I have discovered, after long experimentation, that invariably the loss of seal in the joint which permits the penetration of moisture into the joint so as to permit passage of the electrostatic current from one half of the flange to the other occurs, not in or around the gasket separating the flanges as might be expected, but in or around the spools and washers insulating the individual bolts. I have discovered that the pipe joints successfully withstand, in terms of electrical insulating integrity, the movements and stresses encountered by the joint in service, either lying on or under the ground, if a part of the force exerted by the bolts against the flanges is transmitted through critically sized deformable rings of insulating material snugly disposed around the insulating spools or other elements surrounding the bolts. The insulating washer accommodating the spool is provided with an annular recess of width adequate to receive the deformable ring but of depth to receive a part only of the ring. In order to achieve and maintain the desired electrical integrity, it is preferred that the volumes of the uncompressed ring and recess be in the ratio of 1.4:1 to 1.6. A very satisfactory ratio for most installations is about 1.5:1. Desired ratios are about double the ratios of O-ring cross-sectional areas to accommodating groove sectional area recommended by manufacturers of the O-rings to achieve tight static joints against fluid pressure. I have discovered, however, that the necessary electrical insulating integrity is not achieved at ratios below 1.4:1. Ratios above 1.6 may be used, but they result in the O-ring transmitting the entire force exerted by the tensioned bolts in maintaining the flange tight with possible damage to the material of which the O-ring is fabricated.

An embodiment of the invention is disclosed in the accompanying drawings in which.

Figure 1:
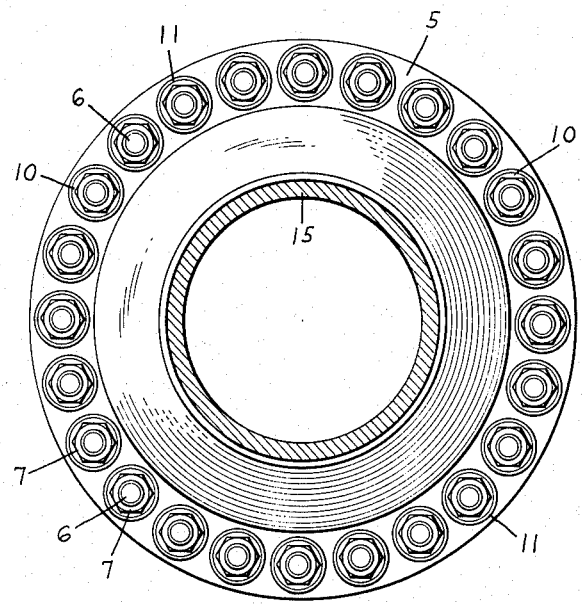
FIGURES 1 and 2 are front elevation and side views of a typical joint used in practice of the invention.
Figure 2:
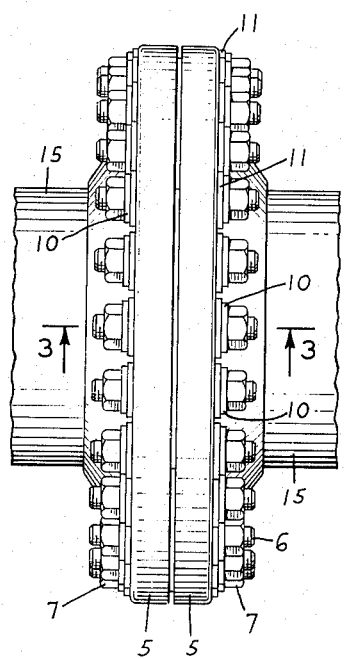

In the drawings matching flanges 5 provided in known manner with rings of registering bolt holes and welded or otherwise secured to contiguous pipe sections 15, are compressed by means of bolts 6 and nuts 7 against a suitable internal insulating gasket 8 made, for example, of plied phenolic resin impregnated fabric.

Surrounding each bolt is an insulating spool 9 which extends through the bolt hole beyond the outer face of the flange and into an accommodating recess of a metallic bearing member 10 at each end of the bolt without being seated in the bottom of the recess so that spool 9 is not subjected to longitudinal compressive stresses in the assembled joint. Disposed between members 10 and the outer faces of flanges 5 are insulating washers 11 which, as is the case with spools 9, may be made of material similar to that employed in gasket 8.

Each insulating washer 11 is provided with an annular recess 12 adjacent spool 9 and the outer face of the adjacent flange 5 accommodating a deformable flexible ring 13 of substantially the same sectional diameter as the width of annulus 12, the latter, however, having a depth such that the ratio of O-ring sectional area to cross-sectional area of the recess is at least 1.4:1 and preferably 1.4:1 to 1.6:1, being, for example, about 1.5:1.

Figure 3:
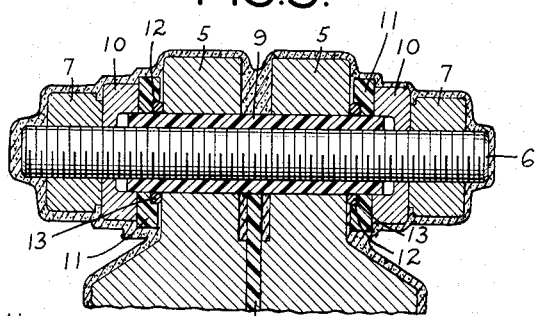
FIGURE 3 is a sectional view taken along 3—3 of FIGURE 2 illustrating the disposition of the insulating elements and ring of the invention around a bolt of an assembled joint before placing the bolt under tension.

For the purpose of clarity, FIGURE 3 illustrates the ring and recess in approximately their interrelationship when the bolt assembly is completed but before the bolt has been put under tension.

Figure 4:
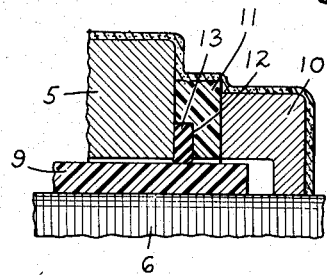
FIGURE 4 is an enlarged view in section illustrating the relationship of the above-described ring to other parts around a bolt after the latter has been placed under tension.

In FIGURE 4 the ring, recess, spool and flange relationship shown is typical of that existing when the bolt is under tension adequate to maintain electrical insulating integrity of the joint. As can be seen from FIGURE 4, force exerted against the outer faces of the flanges is transmitted through ring 13, which is deformed so that it substantially completely fills recess 12 and through insulating washers 11.

In practice I have found that with flanges sized to accommodate pipes of 2½" to 36" in diameter rings 13 having sectional diameter of 0.07 inch and annular recesses 1/16" width and 0.04 inch depth are satisfactory. When the flanges are inserted in gas or oil lines adapted to withstand internal pressures up to 3,000 pounds per square inch and, as is usual in such cases, the bolts are placed under tension by machine tightening of the nuts to torsion of 70 to 1,100 foot pounds. I have found that rings 13 fabricated of Buna-N rubber or neoprene are satisfactory and provide joints having the required integrity in service at temperatures up to about 250° F. as in petroleum product and water transmission lines and at temperatures above about 250° F., as in steam lines silicone rubbers may be used. It is preferred, and in some locations necessary, that the assembled joints be coated with asphalt or other suitable water resistant and insulating substances to prevent current leakage along the outer faces of the joint.

I claim:

1. An electrically insulated pipe joint comprising opposed, metallic matching flanges attached to adjoining pipe sections, electrically insulated sealing means disposed between and associated with said matching flanges adapted upon compression between said flanges to prevent leakage of fluid from the joint and passage of electric current between the flanges, a plurality of bolts disposed around said flanges adapted to maintain the flanges and said means under compression comprising bolts enclosing electrical insulating sleeve members extending through said registering holes in said flanges, said sleeve members terminating beyond the outer faces of said flanges, nuts on said bolts, ring means disposed adjacent said nuts, said ring means having a bore and a counter bore therein, said bore receiving said bolt and said counter bore receiving the terminal end of said sleeve member, electrical insulating washers disposed around said sleeve members and between said ring means and the outer faces of said flanges, a counter bore formed in said washers providing an annular recess opening toward said flange outer faces, a ring of resilient electrical insulation material deformable upon being compressed disposed snugly in said last recess and around said enclosing insulating members, said last named rings having cross-sectional area in uncompressed form of at least 1.4 times the cross-sectional area of said annular recesses, said recessed ring means, said washer, said sleeve members and said resilient ring being so dimensioned and proportioned that upon tightening of said nuts in said bolts, axial pressure is transmitted to flanges only through said ring means, said resilient ring being compressed thereby to completely fill said recess and to extrude into contact with said sleeve member, thereby applying a radial force thereto, and electrical insulating material covering the exterior of the joint.

2. An electrically insulated pipe joint comprising opposed, metallic matching flanges attached to adjoining pipe sections, electrically insulated sealing means disposed between and associated with said matching flanges adapted upon compression between said flanges to prevent leakage of fluid from the joint and passage of electric current between the flanges, a plurality of bolts disposed around said flanges adapted to maintain the flanges and said means under compression comprising bolts enclosing electrical insulating sleeve members extending through said registering holes in said flanges, said sleeve members terminating beyond the outer faces of said flanges, nuts on said bolts, ring means disposed adjacent said nuts, said ring means having a bore and a counter bore therein, said bore receiving said bolt and said counter bore receiving the terminal end of said sleeve member, electrical insulating washers disposed around said sleeve members and between said ring means and the outer faces of said flanges, a counter bore formed in said washers providing an annular recess opening toward said flange outer faces, and a ring of resilient electrical insulation material deformable upon being compressed disposed snugly in said last recess and around said enclosing insulating members, the ratio of cross-sectional areas of said last named rings in uncompressed form and the recess being in the range of 1.4:1 to 1.6:1; said recessed ring means, said washer, said sleeve members and said resilient ring being so dimensioned and proportioned that upon tightening of said nuts in said bolts, axial pressure is transmitted to flanges only through said ring means, the latter being compressed thereby to completely fill said recess and to extrude into contact with said sleeve member, thereby applying a radial force thereto.

References Cited by the Examiner

UNITED STATES PATENTS

| 1,208,620 | 12/16 | Moser. |
| 1,304,067 | 5/19 | Kowalski. |
| 1,592,175 | 7/26 | Boyd _____ 245—48 |
| 2,646,822 | 7/53 | Ferguson _____ 285—55 |
| 2,666,804 | 1/54 | Gross. |
| 2,701,871 | 2/55 | Rauch. |
| 2,752,579 | 6/56 | Caldwell _____ 285—48 X |

FOREIGN PATENTS

| 182,013 | 12/05 | Germany. |
| 567,159 | 1/45 | Great Britain. |

CARL W. TOMLIN, *Primary Examiner.*